Dec. 17, 1968

G. I. WALTER 3,416,580

DOWELING MACHINE

Filed April 14, 1966

INVENTOR:
GLEN I. WALTER

BY
ATTORNEY

United States Patent Office 3,416,580
Patented Dec. 17, 1968

3,416,580
DOWELING MACHINE
Glen I. Walter, 1510 Ave. F, Kearney, Nebr. 68847
Filed Apr. 14, 1966, Ser. No. 542,562
2 Claims. (Cl. 144—92)

ABSTRACT OF THE DISCLOSURE

A base with a horizontal-bearing-providing slideway; a motor supporting carriage mounted for linear horizontal movement on the slideway; a motor mounted on the carriage with its shaft oriented parallel with the direction of movement of the carriage; drill holding means on the shaft; a workpiece face plate having an opening aligned with the shaft of the motor and workpiece holding means projecting from the face plate adjacent the opening; a workpiece platform mounted on the base for vertical movement with respect to the base and with respect to the face plate; means for adjusting the vertical height of the platform and means for moving the carriage along the base slideway.

A handle projecting above the motor for moving the carriage manually.

Background of the invention

This invention relates to a machine for boring dowel holes.

One of the objects of this invention is to provide a machine for boring dowel holes at accurately predetermined locations, which machine is simple, rugged, portable, and inexpensive.

Other objects will become apparent to those skilled in the art in the light of the following description and accompanying drawing.

Summary of the invention

In accordance with this invention, generally stated, a dowel hole boring machine is provided which has a base with a horizontal, bearing-providing slideway. A motor-supporting carriage is mounted on the slideway for linear horizontal movement. A motor is mounted on the carriage, with its shaft oriented parallel with the direction of linear movement of the carriage. The shaft carries some drill-holding means, such as a conventional chuck. A workpiece face plate is mounted vertically on the base, with a planar surface perpendicular to the direction of linear movement of the carriage. The faceplate has an opening in it aligned with the shaft of the motor, in the sense that a drill carried by the shaft of the motor can project through it. A workpiece platform, also connected to the base, and in that sense carried by it, is mounted for vertical movement with respect to the faceplate, on the side of the faceplate away from the motor. The platform has a workpiece-supporting surface lying parallel with the direction of linear movement of the carriage and perpendicular to the surface of the face plate. The supporting surface of the platform is closely adjacent the faceplate. Means are provided for adjusting the vertical height of the platform, and means are provided for moving the carriage, hence the motor, along the base slideway between a position at which a drill carried by the shaft of the motor projects through and beyond the opening in the workpiece faceplate in the direction of the platform and a position at which it does not so project.

In the preferred embodiment, the means for moving the motor-supporting carriage include a lever, one end of which is pivoted to the base, and the other end of which forms a handle. A link, one end of which is pivotalily connected to the lever, is pivotally connected at its other end to the carriage, so that the carriage can be moved back and forth manually with little effort.

Also in the preferred embodiment, the motor carriage includes bronze collars, riding on tubular horizontal supports constituting the slideway, and carrying a bridging plate, to which the motor is bolted. A selectively movable stop is provided on at least one of the tubular supports so that the distance the carriage can be moved toward the platform may be accurately gaged and controlled. Also in the preferred embodiment, the platform is carried by elongated sleeves which are closely but slidably mounted on posts secured to the base, and at least one of the sleeves in turn, is provided with internally threaded adjusting screw bosses, threadedly engaging an externally threaded, vertically journalled adjusting screw, equipped with a handle by which it can be turned to raise and lower the platform.

Description of the preferred embodiment

Figure 1:
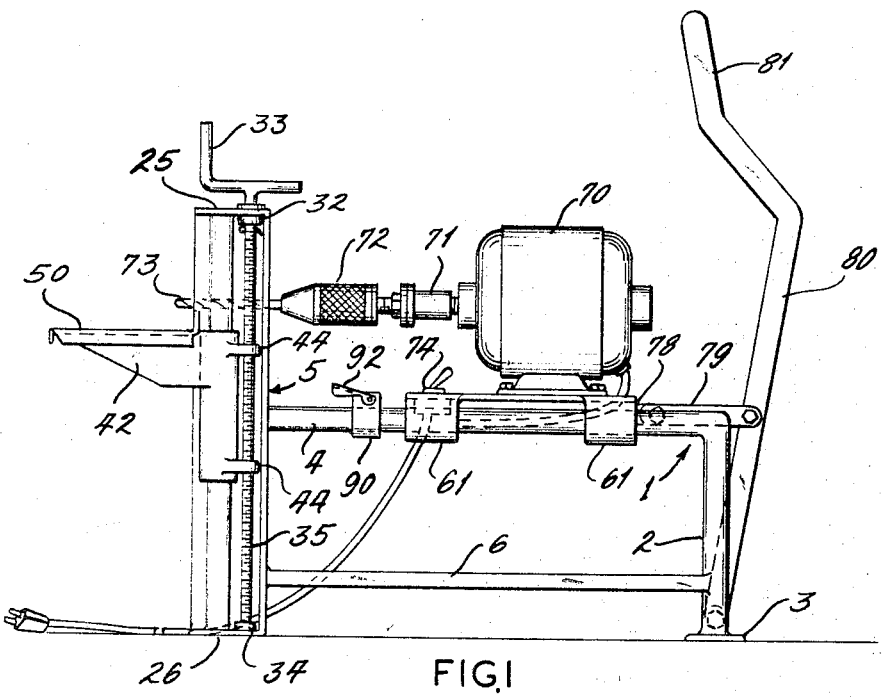
FIGURE 1 is a view in side elevation of one illustrative embodiment of dowel hole boring machine of this invention.

Referring now to the drawing for one illustrative embodiment of this invention, reference numeral 1 indicates a base, which, in this embodiment, includes two spaced stanchions 2, connected at their lower ends, by a sill 3, a pair of tubular, horizontal rails 4, which, in this embodiment, are integral with the stanchions 2, an end frame 5, to which the rails 4 are welded or otherwise secured, and two longitudinal braces 6, one extending between each of the stanchions and the end frame 5.

The end frame 5, in the embodiment shown, is made up of two, vertical, L-shaped wing sections 15, connected by a web which serves as a workpiece face plate 20, an upper flange 25, and a lower flange 26.

Figures 2, 3, 4:
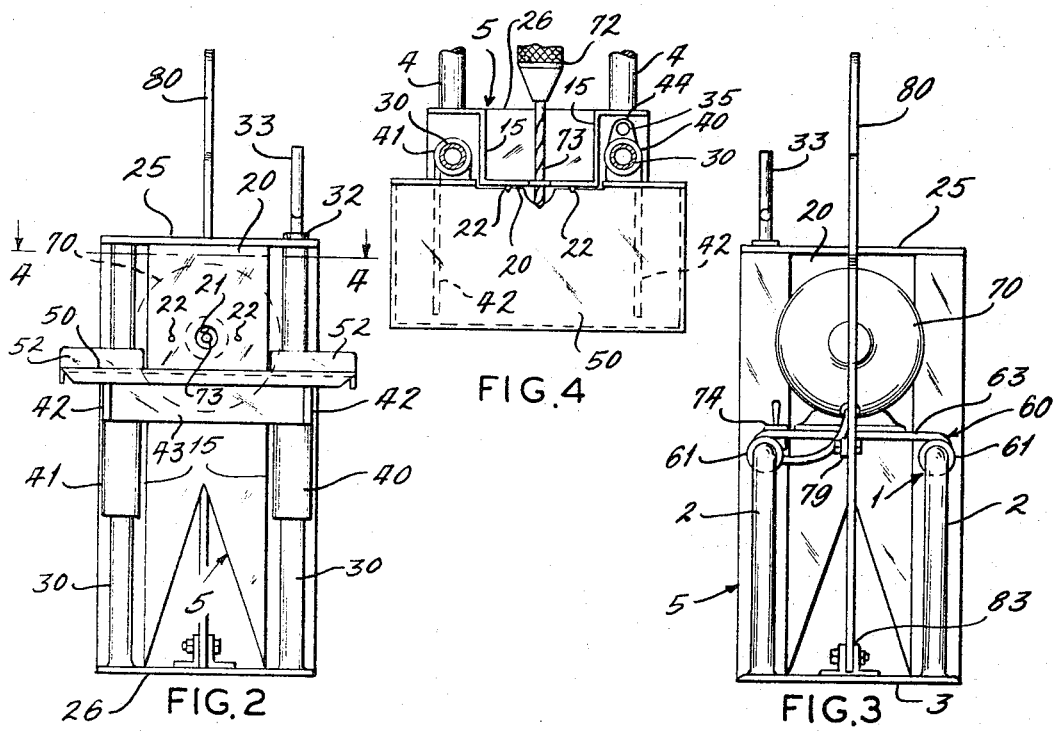
FIGURE 2 is a view in front elevation of the machine shown in FIGURE 1.
FIGURE 3 is a view in rear elevation of the machine shown in FIGURES 1 and 2.
FIGURE 4 is a sectional view taken along the line 4—4 of FIGURE 1.

The wing sections 15 may be made integral with the faceplate 20, and the flanges can be welded to the upper and lower edges of the faceplate and wing sections. Within the corners defined by the L-shaped wing sections 15, are vertical posts 30, secured at their upper and lower ends to the facing surfaces of the upper and lower flanges 25 and 26 respectively. The posts 30 are spaced from the wing sections and lie between the inner face of the wing sections and the plane of the outer face of the faceplate 20, as shown in FIGURES 1 and 4.

Between the wing sections and one of the posts 30 is a vertical adjusting screw 35, the lower end of which is journalled in a boss mounted on the upper surface of the lower flange 26, and the other end of which passes through a bushing 32 in a hole in the upper flange 25 and terminates in a handle 33 by which it can be turned.

A sleeve 40 is slidably mounted on one of the posts 30, and a sleeve 41 is mounted on the other of the posts 30. Both sleeves have, integral with them, a supporting arm 42, an upper surface of which is flat and horizontal. In the embodiment shown, a brace 43 extends between the arms 42 contiguous the sleeves but clear of the face plate 20. The sleeve 41 also has integral with it two vertically spaced ears 44, having in them vertically aligned internally threaded holes by which the sleeve is threadedly mounted on the adjusting screw 35.

A workpiece-supporting platform 50 is mounted on the flat upper horizontal surface of the arms 42, spanning the arms. The platform 50 has an edge closely adjacent and parallel to the faceplate 20, and a pair of fence members 52 lying on either side of the faceplate 20 with their faces in substantially the same plane as the outer surface of the faceplate 20. As shown in FIGURE 4, the platform is cut away at the center of the edge adjacent the faceplate to permit sawdust to fall clear of the platform.

Two holding prongs 22, one on either side of a hole 21 in the faceplate, project from the outer face of the faceplate in the direction of the platform.

The horizontal base rails 4 are parallel to one another and form a slideway for a carriage 60. The carriage 60 is made up of four bearing sleeves 61, two on each rail 4, and a bridging plate 63, secured to the sleeves 61 and bridging between the rails 4. An electric motor 70 is bolted to the plate 63, with the shaft of the motor parallel with the rails 4. A coupling 71 is mounted on the shaft of the motor, and a chuck 72 is mounted on the coupling. A drill 73 is mounted in the chuck 72. The motor is electrically connected to a toggle switch 74 mounted on the plate 63, and the toggle switch is electrically connected to an electrical conductor which is adapted to be plugged into a suitable electric outlet.

A vertically oriented ear 78 is secured to the under side of the plate 63 and projects in a direction away from the faceplate. The ear 78 has a hole in it to take a pivot bolt, by which one end of a link 79 is mounted on the ear 78. The other end of the link 79 is pivotally mounted on a lever 80. The lower end of the lever 80 is hingedly mounted on a hinge bracket 83 secured to the upper side of the sill 3. The upper end of the lever 80 is provided with a handle 81 which is dog-legged toward the faceplate end of the machine to put it in a convenient position in use.

A stop collar 90 is mounted on at least one of the rails, between the carriage 60 and the end frame 5. The stop collar 90 is split axially and provided with a clamping lever 92 by which the collar can be selectively clamped to the rail 4 to serve as a stop for the carriage 60.

The bearing sleeves 61 can be brushed with bronze or can be made of solid bronze or other bearing metal to provide a close but readily slidable fit.

Any suitable clamping and fence arrangements can be mounted on or made part of the platform 50. For example, a pantograph arrangement, with a base link mounted by pins in two spaced holes in the platform parallel with the plane of the faceplate, can be used to clamp parallel-sided boards securely against the faceplate. Such a clamp can be used with a fence at other positions, other holes being provided for that purpose. The prongs 22 inhibit movement along the faceplate in any direction.

In use, the lever 80 is moved back (in a direction away from the faceplate) until the drill 73 is clear of the faceplate 20. The platform 50 is raised or lowered, by means of the adjusting screw 35, to ensure the right vertical spacing, and the wood to be bored is placed on the platform and adjusted transversely of the platform until it is properly located with respect to the drill. Preferably, lines are scribed or otherwise provided on the outer surface of the faceplate to mark the vertical and horizontal coordinates of the axis of the drill, so that one need only measure from the surface of the platform to the horizontal line, to determine the proper vertical spacing, and line up the vertical guide line with a mark on the piece of wood, to establish the proper location of the hole. The motor is then turned on by means of the toggle switch 74, the wood is held firmly in position either manually or with a clamp, and the handle 81 is pulled toward the operator moving the carriage, hence the drill, toward the wood. The drill will penetrate the wood to the depth permitted by the stop collar 90. Thus, the location and the depth of the hole are accurately predeterminable.

It can be seen that any size drill which can be accommodated by the chuck, can be used interchangeably. It can also be seen that different sized chucks can easily be mounted on the same coupling. Even differently rated motors can be used, although adjustment would have to be made for different vertical heights of the motor shaft from the motor base.

Numerous variations in the construction of the machine of this invention, within the scope of the appended claims, will occur to those skilled in the art in the light of the foregoing disclosure. For example, the rails 4 may be, and ordinarily would be, made separately from the stanchions 2 and assembled; the movement of the carriage back and forth may be accomplished by a screw mechanism, driven manually or electrically; and a second adjusting screw can be provided at the other side, linked with a chain to ensure that no imbalance is produced. These are merely illustrative.

Having thus described the invention, what is claimed and desired to be secured by Letters Patent is:

1. A dowel hole boring machine comprising a base having a horizontal, bearing-providing slideway; a motor-supporting carriage mounted for linear horizontal movement on said slideway; a motor mounted on said carriage and having a shaft oriented parallel with the direction of linear movement of the carriage; drill-holding means mounted on said shaft; a workpiece faceplate fixedly mounted on said base, said faceplate having a planar surface perpendicular to the direction of linear movement of the carriage, an opening in it aligned with the shaft of the motor, and workpiece holding means projecting therefrom; a workpiece platform carried by said base for vertical movement with respect thereto and with respect to said faceplate, said platform having a workpiece supporting surface parallel with the direction of linear movement of the carriage and perpendicular to the surface of the faceplate, and being closely adjacent thereto; means for adjusting the vertical height of said platform, and means for moving said carriage, hence said motor, along said base slideway between a position at which a drill carried by said drill holding means projects through and beyond the opening in the workpiece faceplate in the direction of the platform and a position at which it does not so project.

2. The machine of claim 1 wherein the means for moving the carriage includes a lever with a handle part projecting above said motor and an end pivoted to the base, and a link pivotally connected to said carriage and to said lever.

References Cited
UNITED STATES PATENTS

| 3,045,727 | 7/1962 | Clarke | 144—92 |
| 3,008,359 | 11/1961 | Mackey. | |
| 1,667,022 | 4/1928 | Wood | 144—92 |

FRANCIS S. HUSAR, *Primary Examiner.*

U.S. Cl. X.R.

77—5